US00RE39377E

(19) United States
(12) Reissued Patent
Kumada et al.

(10) Patent Number: US RE39,377 E
(45) Date of Reissued Patent: Nov. 7, 2006

(54) SLIDING BEARING

(75) Inventors: Yoshio Kumada, Toyota (JP); Katsuyuki Hashizume, Toyota (JP); Soji Kamiya, Toyota (JP)

(73) Assignee: Taiho Kogyo Co., Ltd., Toyota (JP)

(21) Appl. No.: 10/210,813

(22) PCT Filed: Mar. 17, 1995

(86) PCT No.: PCT/JP95/00467

§ 371 (c)(1),
(2), (4) Date: Feb. 26, 1996

(87) PCT Pub. No.: WO95/25904

PCT Pub. Date: Sep. 28, 1995

Related U.S. Patent Documents

Reissue of:
(64) Patent No.: 5,704,720
Issued: Jan. 6, 1998
Appl. No.: 08/553,584
Filed: Feb. 26, 1996

(30) Foreign Application Priority Data

Mar. 18, 1994 (JP) ..... 6-073962

(51) Int. Cl.
*F16C 17/00* (2006.01)

(52) U.S. Cl. ..... 384/625
(58) Field of Classification Search ..... 384/625, 384/123, 112, 261, 322
See application file for complete search history.

(56) References Cited

U.S. PATENT DOCUMENTS

| | | | |
|---|---|---|---|
| 4,400,099 | A | 8/1983 | Ehrentraut |
| 4,538,929 | A | 9/1985 | Ehrentraut et al. |
| 4,561,787 | A | 12/1985 | Ehrentraut et al. |
| 4,606,653 | A | 8/1986 | Ehrentraut et al. |
| 5,071,263 | A | 12/1991 | Kamiya et al. |
| 5,116,144 | A | 5/1992 | Kamiya et al. |
| 5,238,311 | A | 8/1993 | Katou et al. |

FOREIGN PATENT DOCUMENTS

| | | |
|---|---|---|
| AT | 385 822 B | 5/1988 |
| EP | 0 155 257 B1 | 9/1985 |
| EP | 0 155 257 A2 | 9/1985 |
| JP | A-60-205014 | 10/1985 |
| JP | A-63-6215 | 1/1988 |
| JP | U-63-30619 | 2/1988 |
| JP | B2-63-11530 | 3/1988 |
| JP | U-63-53922 | 4/1988 |
| JP | A-2-142921 | 6/1990 |
| JP | A-4-39461 | 2/1992 |
| JP | A-5-6412 | 1/1993 |
| JP | A-5-8337 | 1/1993 |
| JP | A-6-19850 | 1/1994 |

*Primary Examiner*—Lenard A. Footland
(74) *Attorney, Agent, or Firm*—Oliff & Berridge PLC

(57) ABSTRACT

A helical groove 1B is formed in the sliding surface 1A of a sliding bearing 1 over the entire axial region thereof. To establish the height of a peak 1a defined by the helical groove 1B, an imaginary reference line L extending parallel to the axis is formed which is determined such that the total cross-sectional area of all the peaks 1a is equal to the total cross-sectional area of all the valleys 1b when the helical groove 1B is considered in axial section. A height, as measured from the reference line L to the top 1a' of the peak 1a is chosen in the range of from 1 to 8 μm. The space created by forming the valleys 1b allows the supply of lubricant oil to be increased, thereby simultaneously achieving a reduction in the frictional resistance and the occurrence of an impact sound.

34 Claims, 5 Drawing Sheets condition of experiment :

sound pressure level from series four cylinder engine, when operated at 1500 rpm and half-load, is measured with a microphone.

condition of experiment :

series four cylinder engine oil temperature of 80±1 ℃
oil variety 7.5w-30 oil clearance of 45 μm

SLIDING BEARING

Matter enclosed in heavy brackets [ ] appears in the original patent but forms no part of this reissue specification; matter printed in italics indicates the additions made by reissue.

*This is one of two (2) reissue applications directed to various aspects of a sliding bearing described in U.S. Pat. No. 5,704,720, which corresponds to U.S. patent application Ser. No. 08/553,584 filed Feb. 26, 1996. The first filed reissue application is the present application. The other reissue application is a continuation of the present application. The serial number and filing date of the continuation application are U.S. patent application Ser. No. 10/626,553 filed Jul. 25, 2003.*

TECHNICAL FIELD

The invention relates to a sliding bearing, and more particularly, to a sliding bearing in which annular peaks are formed on a surface which is disposed in sliding contact with a rotating shaft.

BACKGROUND

Customarily, a slight clearance is provided between the surfaces of a sliding bearing and a rotating shaft which are disposed in sliding contact with each other when the rotating shaft is rotatably journalled by the sliding bearing. In such a conventional sliding bearing, when a smaller internal diameter of the surface of the sliding bearing which is disposed for sliding contact is chosen in an attempt to minimize the magnitude of the clearance, there results the disadvantage that a frictional resistance between the surfaces of the sliding bearing and the rotating shaft which are disposed in sliding contact with each other increases. Conversely, when a larger inner diameter is chosen for the sliding surface of the sliding bearing to increase the clearance and minimize the frictional resistance, there is another disadvantage that the occurrence of an impact sound between the surfaces increases. Thus, it has been difficult in a conventional sliding bearing to achieve a reduction in the frictional resistance between the sliding surfaces and a reduction in the impact sound simultaneously.

DISCLOSURE OF THE INVENTION

In view of the foregoing, the invention provides a sliding bearing including a plurality of axially spaced, annular continuous or discontinuous peaks which extend circumferentially on a surface of the sliding bearing which is disposed for sliding contact with a rotating shaft in which, as viewed in an axial section, the various portions are defined on the basis of an imaginary reference line intersecting with individual peak regions and being parallel to the axis and is determined such that the total cross-sectional area of peak regions located above the reference line is equal to the total cross-sectional area of valley-shaped recess regions located below the reference line, the top of the peak having a height $\Delta C$ above the imaginary reference line and a height as measured from the bottom of the valley-shaped recess to the top of the peak being denoted by $\underline{h}$, the parameter $\Delta C$ being taken on an ordinate and the parameter $\underline{h}$ being taken on the abscissa in a graphical representation, the parameters $\Delta C$ and $\underline{h}$ being located within a range defined by four rectilinear lines given by the following mathematical equations:

$$\underline{h}=\Delta C \quad (1)$$

$$\underline{h}=5/1.9\Delta C \quad (2)$$

$$\underline{h}=8 \quad (3)$$

$$\Delta C=1 \quad (4)$$

where $\underline{h}$ and $\Delta C$ are measured in unit of μm.

With the sliding bearing thus constructed, a lubricant oil is stored in the space of an annular groove formed between a pair of axially adjacent peaks or in the valley-shaped recess, whereby the amount of lubricated oil which is maintained between the sliding surfaces can be increased. If the internal diameter of the sliding surface of the sliding bearing is small so as to reduce the clearance between the sliding surface of the rotating shaft and the sliding surface of the sliding bearing, the actual clearance between the rotating shaft and the sliding bearing is large as compared with the conventional sliding bearing, whereby the frictional resistance experienced between the sliding surfaces can be minimized.

As to the occurrence of an impact sound, the peaks on the sliding surface of the bearing and the clearance are effective in reducing the occurrence of an impact sound and, at the same time, the frictional resistance is reduced. In this manner, a reduction in the sliding resistance and a reduction in the occurrence of an impact sound are simultaneously achieved.

BEST MODE OF CARRYING OUT THE INVENTION

Figure 1:
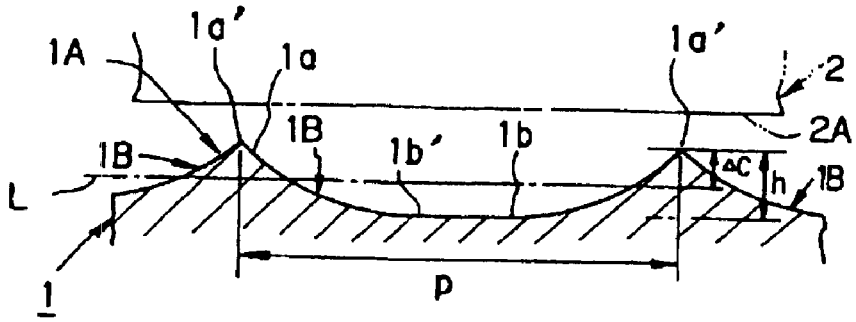
FIG. 1 is an axial cross section of an essential part of a sliding bearing 1 according to one embodiment of the invention is an exaggerated form.

Referring to the drawings, the invention will be described below with reference to several embodiments thereof shown. FIG. 1 shows an axial section of a sliding bearing 1 according to the invention which assumes a cylindrical configuration, a sliding surface 1A being shown.

In the sliding bearing 1 according to the present embodiment, the sliding surface 1A is formed over its entire axial region where it is disposed in sliding contact with a sliding surface 2A of a rotating shaft 2, with a helical groove 1B which is continuously circumferentially, thereby forming a peak 1a between a pair of axially adjacent grooves 1B.

When the rotating shaft 2 has an outer diameter D1 of 50 mm, for example, adjacent peaks 1a, which are formed by the grooves 1B, have a pitch p, which is chosen to be equal to 0.2 mm (200 μm). A height h, as measured from the bottom 1b' of each valley 1b to the top 1a' of the peak 1a, is chosen to be equal to 8 μm at the maximum.

In particular, in the present embodiment, the helical groove 1B is formed by a boring operation, and the height of the top 1a' of each peak 1a is determined in the following manner. Specifically, over the entire axial region of the sliding surface 1A in which the helical groove 1B is formed, an imaginary reference line L is determined which intersects the individual peaks 1a and which extends parallel to the axis such that the total cross-section area of the individual peaks 1a located above the reference line L is equal to the total cross-sectional area of the space comprising the individual valleys 1b. A height ΔC, as measured from the imaginary reference line L to the top 1a' of each peak 1a, is chosen to be is a range from 1 to 8 μm. It will be appreciated from the ratio of the described pitch p of 200 μm and the described height h, which is equal to or less than 8 μm, that the actual cross-sectional configuration of the sliding bearing 1 will be far greater in the lateral or axial direction as compared with the illustration of the cross section shown in FIG. 1.

Figure 2:
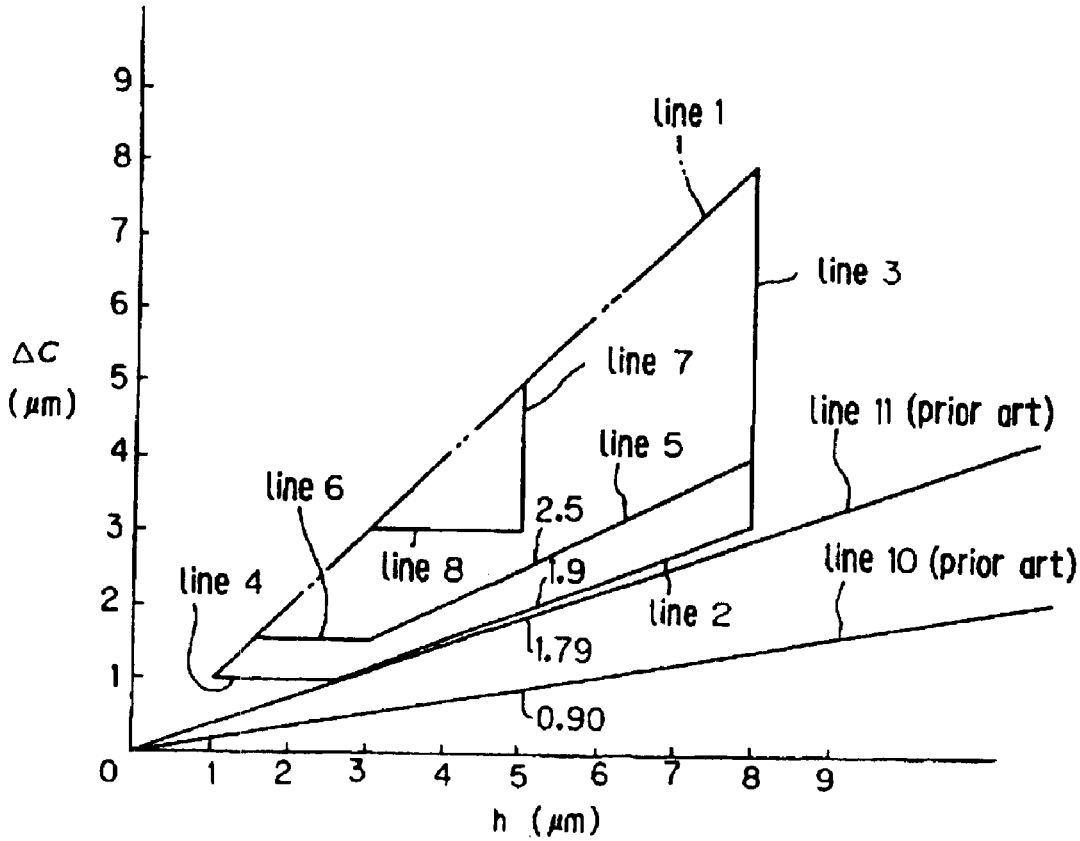
FIG. 2 graphically shows a multitude of rectilinear lines, which illustrate differences in the size of essential parts between a sliding bearing according to the invention and a conventional sliding bearing.

From the results of experiments conducted by the applicant, which will be described later, it is found that there is obtained a preferred bearing performance from a sliding bearing 1 which is located in a range delineated by the four rectilinear lines shown in graphical representation in FIG. 2 and expressed by the following mathematical equations, which define the relationship between the height h, measured from the bottom 1b' of the valley 1b to the top 1a' of the peak 1a and the height ΔC, as measured from the reference line to the top of the peak:

$$h=\Delta C \quad (1)$$

$$hx=5/1.9\Delta C \quad (2)$$

$$h=8 \quad (3)$$

$$\Delta C=1 \quad (4)$$

where h and ΔC are measured in unit of μm.

From the same results of experiments, it is found that a sliding bearing 1 exhibits an excellent bearing performance when it is located in a range defined by four rectilinear lines, expressed by the following equations:

$$h=\Delta C \quad (1)$$

$$h=2\Delta C \quad (5)$$

$$h=8 \quad (3)$$

$$\Delta C=1.5 \quad (6)$$

From the results of experiments, it is also found that the most excellent bearing performance is achieved by a sliding bearing 1 which is located in a range delineated by three rectilinear lines, expressed by the following equations:

$$h=\Delta C \quad (1)$$

$$h=5 \quad (7)$$

$$\Delta C=3 \quad (8)$$

A sliding bearing having a groove formed in its sliding surface is disclosed in Japanese Patent Publication No. 11,530/1988, for example. When the concepts of the height h, the reference line L and the height ΔC according to the present embodiment are applied to the sliding bearing disclosed in this Patent Publication, the relationship between the height h and ΔC are represented by rectilinear lines 10 and 11.

Figure 8:
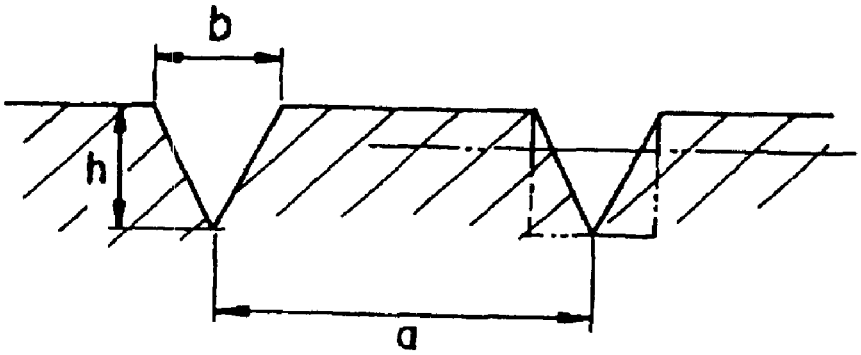
FIG. 8 PRIOR ART
FIG. 8 is an axial cross-section of part of a conventional sliding bearing.

Specifically, in the sliding bearing disclosed in Japanese Patent Publication No. 11,530/1988 (FIG. 4 thereof), the pitch a between adjacent V-shaped grooves and the diameter d of the sliding bearing are related as follows:

$$a=200+0.5\ d+0.006\ a^{\alpha}\ h/b\leqq(1500-a)/1500\ (a-b)/a=100-6\ Vu^{0.6}\ (\%)$$

the denotations used being shown in FIG. 8.

Assuming that Vu=20 m/s, for a combination of d=50 mm, a=240 μm, b≦86 μm, and h≦24 μm, a value corresponding to ΔC as termed in the present embodiment is equal to 15 μm.

If we assume that a=240 μm, b≦86 μm and h≦5 μm, a value corresponding to ΔC is equal to 0.9 μm. Thus, the sliding bearing shown in FIG. 4 of Patent Publication No. 11,530/1988 is located, as considered in FIG. 2, in a range in which ΔC assumes a value which is equal to or less than the rectilinear line 10.

Figure 6:
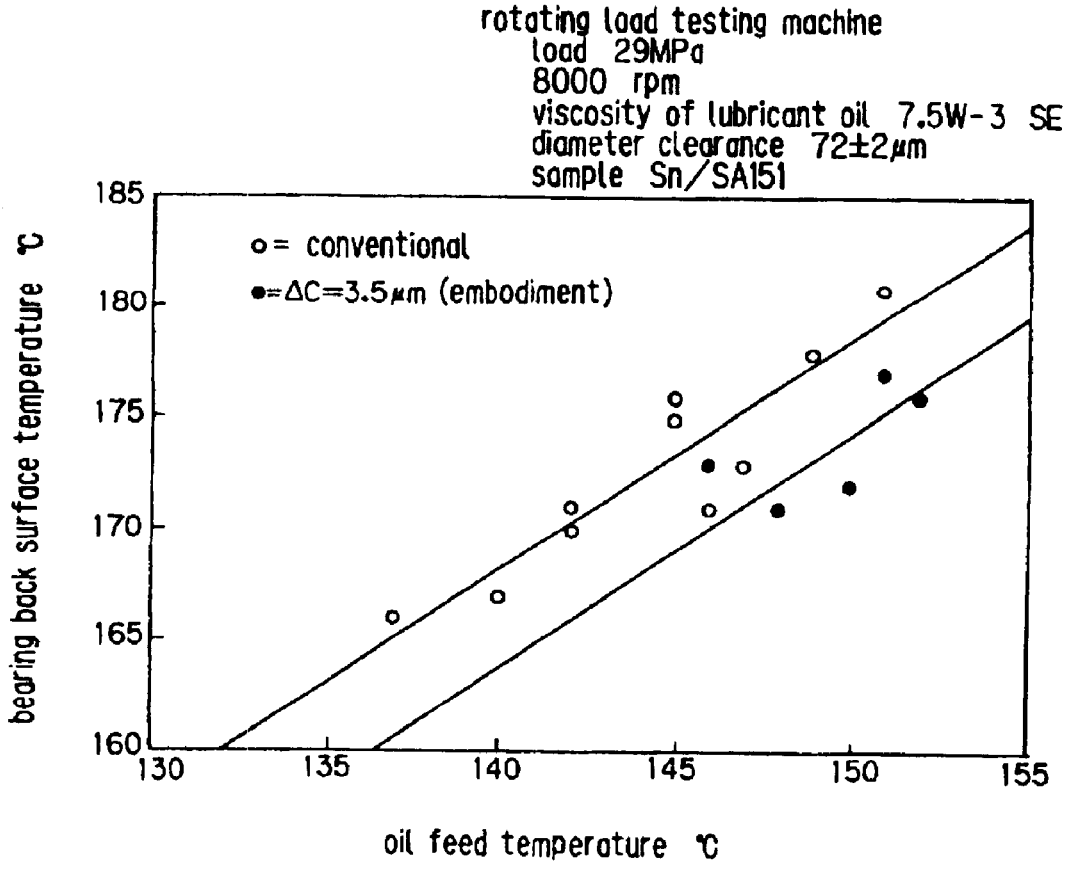
FIG. 6 is a chart indicating the results of measuring the back surface temperature of the bearing according to the invention as contrasted to a conventional sliding bearing.

In the cited Patent Publication No. 11,530/1988, a groove which is trapezoidal in cross-section is shown in FIG. 6 thereof. As indicated by phantom lines in FIG. 8, when the groove is perfectly rectangular in configuration, a value corresponding to ΔC will be 1.79 μm. This is illustrated in FIG. 2 by the rectilinear line 11. Accordingly, a sliding bearing having a groove as indicated by phantom lines in FIG. 8 is located in a range below the rectilinear line 11, which indicates the range of values for ΔC.

FIGS. 3 to 6 indicate results of experiments conducted by mounting the sliding bearing 1 of the present embodiment and the sliding bearing disclosed in the cited Patent Publication on a rotating shaft having an identical outer diameter with an equal clearance for rotation.

The experiments have been conducted by choosing values of h=5 μm and p=0.2 mm for the sliding bearing 1 of the present embodiment. The clearance between the sliding surface 2A of the rotating shaft 2 and the sliding bearing 1 refers to the dimension measured across the top 1a' of the peak 1a and the sliding surface 2A of the rotating shaft 2.

Figure 3:
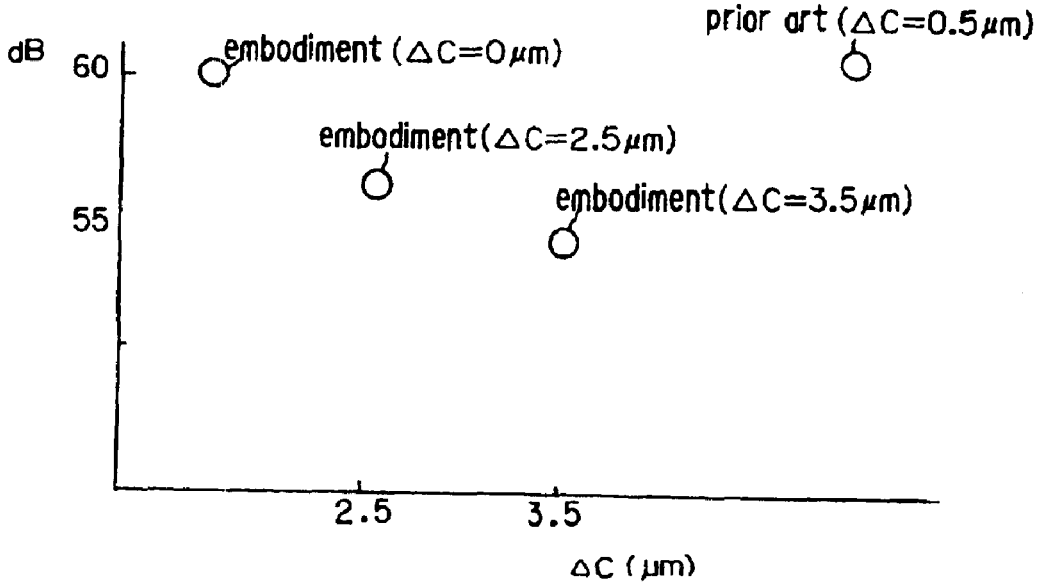
FIG. 3 is the graphical representation of a result of measuring the impact sound in sliding bearings of several embodiments in contrast to that of a conventional sliding bearing.

Initially referring to FIG. 3 and considering the occurrence of an impact sound which is developed by abutment of the rotating shaft and the sliding bearing, it is noted that in the sliding bearing of the invention in which ΔC is chosen to be equal to 0 or where no groove is formed in the sliding surface and in the conventional sliding bearing disclosed in the Patent Publication, the impact sound was measured at an acoustic level of 60 dB. By contrast, when ΔC is chosen to be equal to 2.5 μm, and 3.5 μm in the present embodiment, the acoustic level is reduced by 2 to 3 dB over the prior art.

Figure 4:
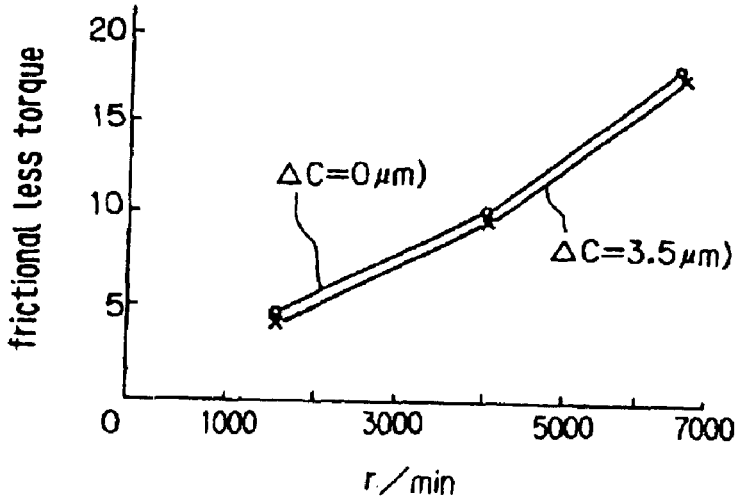
FIG. 4 graphically illustrates the result of measuring the sliding resistance of a sliding bearing according to the embodiment of the invention in contrast to that of a conventional sliding bearing.

Considering the sliding resistance, it will be seen from FIG. 4 that the frictional loss torque of the rotating shaft is reduced for ΔC=3.5 μm than for the prior art or a choice of ΔC=0 at every number of revolutions.

Figure 5:
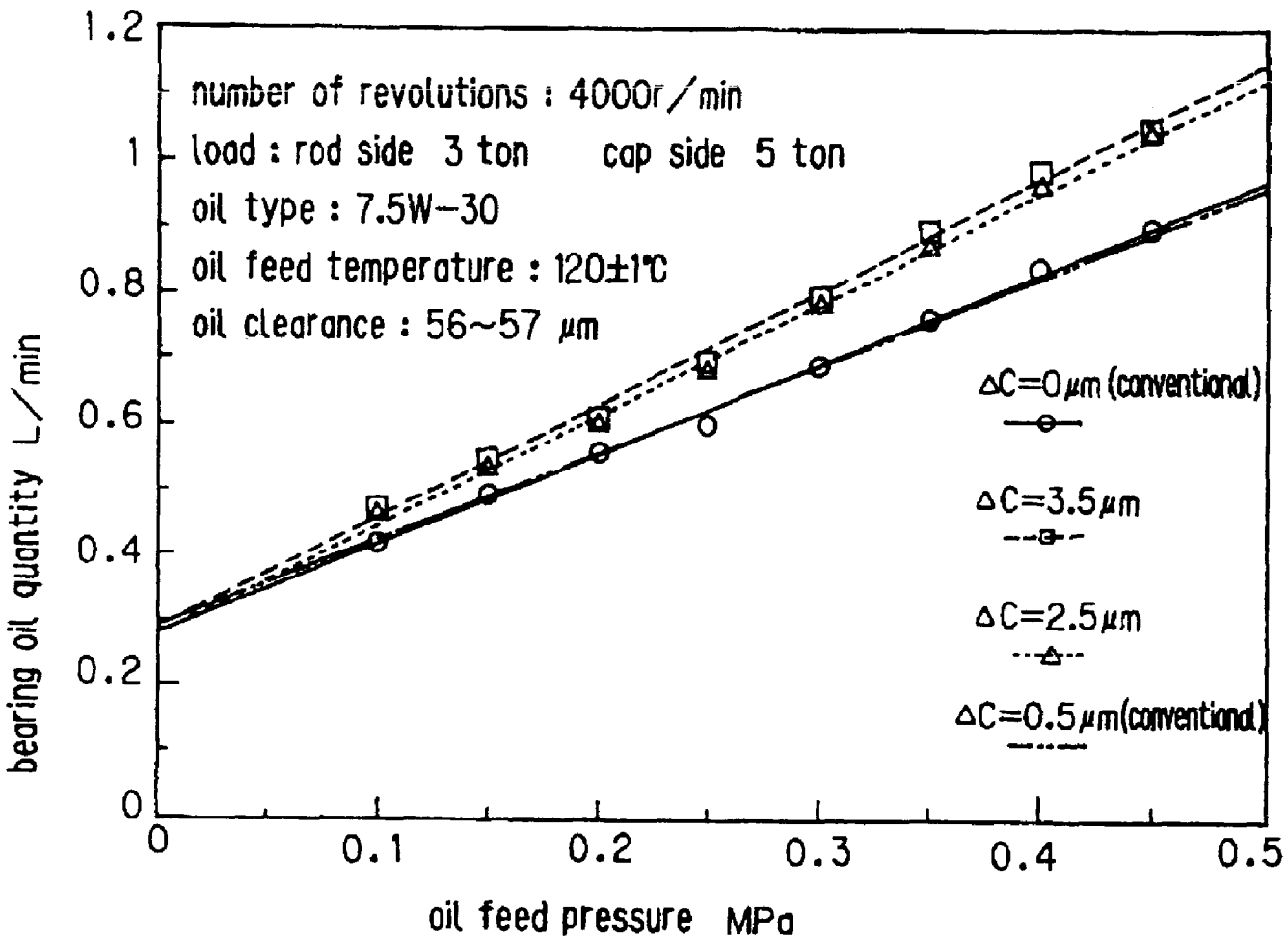
FIG. 5 graphically illustrates the results of measuring the oil quantity stored between the sliding surfaces in the sliding bearings of the invention in contrast to a conventional sliding bearing.

Considering the quantity of lubricant oil which flows between the sliding surfaces of the sliding bearing and the rotating shaft at each number of revolutions, it will be seen from FIG. 5 that when ΔC is equal to 2.5 μm and 3.5 μm according to the present embodiment, the oil quantity is increased over the conventional bearing disclosed in the cited Patent Publication and the choice of ΔC=0 (no groove formed in the sliding surface).

Considering that relationship between the temperature of the back surface of the sliding bearing and the oil feed temperature of the lubricant oil, it will be noted from FIG. 6 that the sliding bearing according to the present embodiment in which ΔC is equal to 3.5 μm, shown by black dots, exhibits a lower oil temperature than the sliding bearing disclosed in the cited Patent Publication which is shown by the white circles.

Accordingly, experimental data shown in FIGS. 5 and 6 indicate that with the sliding bearing 1 of the present embodiment, the provision of the helical groove 1B constructed in the manner mentioned above allows the quantity of lubricant oil, passing over the sliding surfaces 1A and 1B, to be increased. The frictional resistance presented by the sliding surface 1A can be reduced for the reason mentioned before, as indicated in FIG. 4. In addition, the occurrence of an impact sound between the sliding surface 1A and 2A of the sliding bearing of the rotating shaft 2 can be reduced, as indicated in FIG. 3.

Second Embodiment

Figure 7:
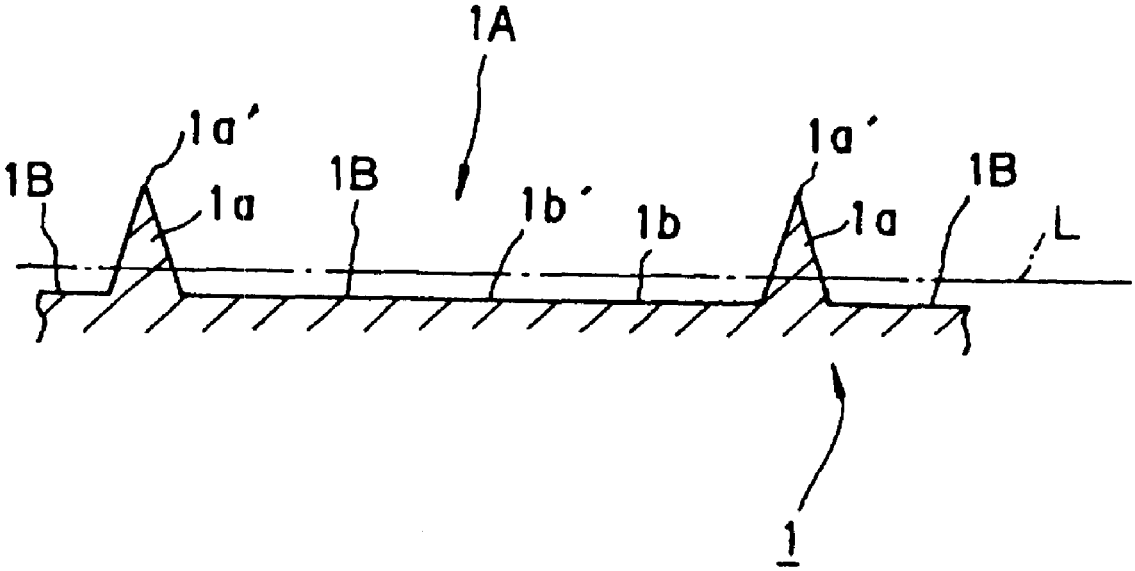
FIG. 7 is an axial cross-section of part of a second embodiment of the invention.

FIG. 7 shows a second embodiment of the invention. In the first embodiment mentioned above, the valley 1b is in the form of a gentle arc in cross section. By contrast, in the second embodiment, the valley 1b is trapezoidal in section. Accordingly, the profile of the peak 1a is in the form of a wedge having an acute angle in section. In other respects, the arrangement is similar to the first embodiment. Accordingly, similar experimental data are obtained as described in connection with the first embodiment, and therefore, a similar functioning and effect are achieved as in the first embodiment.

In both embodiments described above, the peak 1a is helically continuous as a result of the helical groove 1B which continues in the circumferential direction of the sliding surface 1A. However, instead of providing a helical groove, there may be a plurality of annular grooves, which are continuous in the circumferential direction, may be formed in the sliding surface at a given axial spacing, thereby providing angular peaks which are discontinuous in the circumferential direction.

What is claimed is:

1. A sliding bearing including a plurality of axially spaced, annular continuous or discontinuous peaks which extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:

$$h=\Delta C \quad (1)$$

$$h=5/1.9\Delta C \quad (2)$$

$$h=8 \quad (3)$$

$$\Delta C=1 \quad (4)$$

in which h and ΔC are measured in unit of μm, *and in which the valley-shaped recess has a cross-sectional shape that is not exactly geometrically circular.*

2. A sliding bearing according to claim 1, in which ΔC is from 1 to 8 μm.

3. A sliding bearing according to claim 1, in which h is 5 μm and the pitch is 0.2 [μm] *mm*.

4. A sliding bearing according to claim 1, in which a helical groove is formed in the sliding surface to define an annular continuous peak which extends circumferentially between axially adjacent grooves.

5. A sliding bearing according to claim 1, in which a plurality of annular grooves are formed in the sliding surface to define a plurality of annular peaks which extend circumferentially between axially adjacent annular grooves, adjacent peaks being discontinuous from each other.

[6. A sliding bearing according to claim 1, in which the valley-shaped recess is in the form of a gentle arc in cross-section.]

[7. A sliding bearing according to claim 1, in which the valley-shaped recess is trapezoidal in cross-section.]

8. A sliding bearing according to claim 1, in which adjacent peaks have a pitch of about 200 μm.

9. A sliding bearing including a plurality of axially spaced, annular continuous or discontinuous peaks which extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:

$$h=\Delta C \quad (1)$$

$$h=2\Delta C \quad (2)$$

$$h=8 \quad (3)$$

$$\Delta C=1.5 \quad (4)$$

in which h and ΔC are measured in unit of μm *and in which the valley-shaped recess has a cross-sectional shape that is not exactly geometrically circular.*

10. A sliding bearing according to claim 9, in which a plurality of annular grooves are formed in the sliding surface to define a plurality of annular peaks which extend circumferentially between axially adjacent annular grooves, adjacent peaks being discontinuous from each other.

[11. A sliding bearing according to claim 9, in which the valley-shaped recess is in the form of a gentle arc in cross-section.]

[12. A sliding bearing according to claim 9, in which the valley-shaped recess is trapezoidal in cross-section.]

13. A sliding bearing according to claim 9, in which the adjacent peaks have a pitch of about 200 μm.

14. A sliding bearing according to claim 9, in which a helical groove is formed in the sliding surface to define an annular continuous peak which extends circumferentially between axially adjacent grooves.

15. A sliding bearing including a plurality of axially spaced, annular continuous or discontinuous peaks which extend circumferentially on surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by three rectilinear lines given by the following mathematical equations:

$$h=\Delta C \quad (1)$$

$$h=5 \quad (2)$$

$$\Delta C=3 \quad (3)$$

in which h and ΔC are measured in unit of μm *and in which the valley-shaped recess has a cross-sectional shape that is not exactly geometrically circular.*

[16. A sliding bearing according to claim 15, in which the valley-shaped recess is in the form of a gentle arc in cross-section.]

[17. A sliding bearing according to claim 15, in which the valley-shaped recess is trapezoidal in cross-section.]

18. A sliding bearing according to claim 15, in which adjacent peaks have a pitch of about 200 μm.

19. A sliding bearing according to claim 15, in which a helical groove is formed in the sliding surface to define an annular continuous peak which extends circumferentially between axially adjacent grooves.

20. A sliding bearing according to claim 15, in which a plurality of annular grooves are formed in the sliding surface to define a plurality of annular peaks which extend circumferentially between axially adjacent annular grooves, adjacent peaks being discontinuous from each other.

*21. A sliding bearing including a plurality of axially spaced, annular continuous or discontinuous peaks which extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:*

$$h=\Delta C \quad (1)$$

$$h=5/1.9\Delta C \quad (2)$$

$$h<3 \quad (3)$$

$$\Delta C=1 \quad (4)$$

*in which h and ΔC are measured in unit of μm.*

*22. A sliding bearing according to claim 21, in which the valley-shaped recess has a cross-sectional shape that is not exactly geometrically circular.*

*23. A sliding bearing according to claim 21, in which the valley-shaped recess is trapezoidal in cross-section.*

*24. A sliding bearing according to claim 21, in which a plurality of annular grooves are formed in the sliding surface to define a plurality of annular peaks which extend circumferentially between axially adjacent annular grooves, adjacent peaks being discontinuous from each other.*

*25. A sliding bearing according to claim 21, in which ΔC is from 1 to 8 μm.*

*26. A sliding bearing according to claim 21, in which the pitch is 200 μm.*

*27. A sliding bearing according to claim 21, in which a helical groove is formed in the sliding surface to define an annular continuous peak which extends circumferentially between axially adjacent grooves.*

*28. A sliding bearing including a plurality of axially spaced, annular continuous or discontinuous peaks which extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:*

$$h=\Delta C \quad (1)$$

$$h=2\Delta C \quad (2)$$

$$h<3 \quad (3)$$

$$\Delta C=1.5 \quad (4)$$

*in which h and ΔC are measured in unit of μm.*

*29. A sliding bearing according to claim 28, in which a plurality of annular grooves are formed in the sliding surface to define a plurality of annular peaks which extend circumferentially between axially adjacent annular grooves, adjacent peaks being discontinuous from each other.*

*30. A sliding bearing according to claim 28, in which the valley-shaped recess is trapezoidal in cross-section.*

*31. A sliding bearing according to claim 28, in which the valley-shaped recess has a cross-sectional shape that is not exactly geometrically circular.*

*32. A sliding bearing according to claim 28, in which the adjacent peaks have a pitch of about 200 μm.*

*33. A sliding bearing according to claim 28, in which a helical groove is formed in the sliding surface to define an annular continuous peak which extends circumferentially between axially adjacent grooves.*

*34. A sliding bearing including a plurality of axially spaced, annular continuous or discontinuous peaks which*

*extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:*

$$h=\Delta C \quad (1)$$

$$h=5/1.9\Delta C \quad (2)$$

$$h=8 \quad (3)$$

$$\Delta C=1 \quad (4)$$

*and wherein ΔC/h is not between 0.666 and 0.669,*
*in which h and ΔC are measured in unit of μm and in which the valley-shaped recess is trapezoidal in cross-section.*

*35. A sliding bearing including a plurality of axially spaced, annular continuous or discontinuous peaks which extend circumferentially on a surface of the sliding bearing which comes into sliding contact with a rotating shaft in which, as viewed in an axial cross-section, the various portions are defined on the basis of an imaginary reference line which intersects with individual peak regions, extends parallel to the axis and is determined such that the total cross-sectional area of peak regions located above the reference line is equal to the total cross-sectional area of valley-shaped recess regions located below the reference line, the top of the peak having a height ΔC above the imaginary reference line and a height as measured from the bottom of the valley-shaped recess to the top of the peak, denoted by h, the parameter ΔC being taken on an ordinate and the parameter h being taken on the abscissa in a graphical representation, the parameters ΔC and h being located within an area defined by four rectilinear lines given by the following mathematical equations:*

$$h=\Delta C \quad (1)$$

$$h=5/1.9\Delta C \quad (2)$$

$$h=8 \quad (3)$$

$$\Delta C=1 \quad (4)$$

*and wherein ΔC/h is not between 0.666 and 0.669,*
*in which h and ΔC are measured in unit of μm and in which the valley-shaped recess has a cross-sectional shape that is not exactly geometrically circular.*

*36. A sliding bearing according to claim 35, in which ΔC is from 1 to 8 μm.*

*37. A sliding bearing according to claim 35, in which the pitch is 200 μm.*

*38. A sliding bearing according to claim 35, in which a helical groove is formed in the sliding surface to define an annular continuous peak which extends circumferentially between axially adjacent grooves.*

*39. A sliding bearing according to claim 35, in which a plurality of annular grooves are formed in the sliding surface to define a plurality of annular peaks which extend circumferentially between axially adjacent annular grooves, adjacent peaks being discontinuous from each other.*

*40. A sliding bearing according to claim 35, in which h<3.*

* * * * *